3,598,769
PROCESS FOR EXPANDING POLYSTYRENE
Daniel Hanton, La Neuville-Roi, Oise, France, assignor to Compagnie de Saint-Gobain, Neuilly-sur-Seine, France
Filed Apr. 13, 1966, Ser. No. 542,363
Claims priority, application France, Apr. 14, 1965, 13,184
Int. Cl. C08f 47/10; B29d 27/00
U.S. Cl. 260—2.5                                    6 Claims

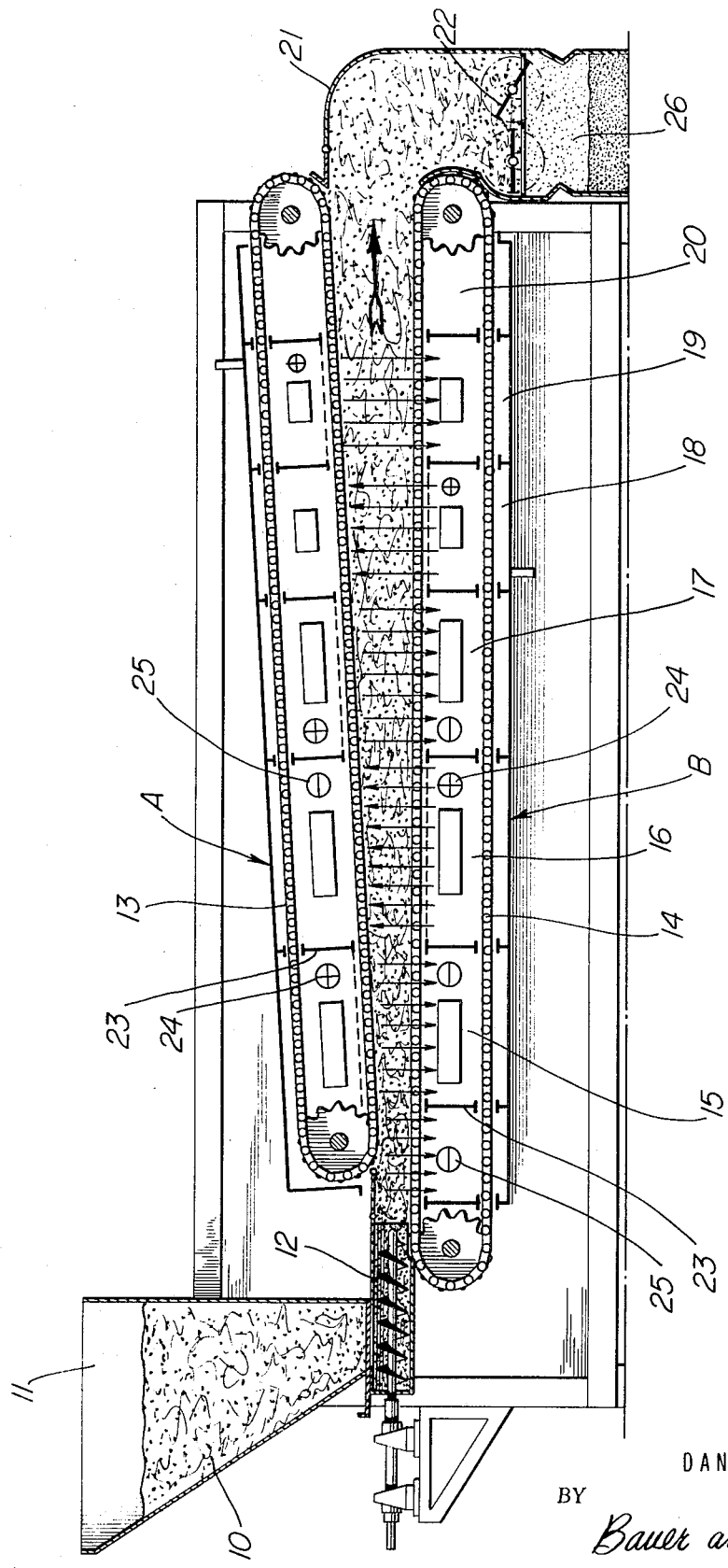

ABSTRACT OF THE DISCLOSURE

Process and apparatus for the expansion of granules of polystyrene containing a blowing agent. The granules are first subjected for a few minutes, to steam at low pressure, following by conditioning for a few hours at about 20° to 40° C. After this the expanded granules are reheated with hot air to about 100° C., then again treated with steam for 30 to 40 seconds. This is followed by conditioning for 1 to 24 hours. In each instance, conditioning is effected by insufflating the granules with warm air at the desired temperature. The cycle just described may be repeated one or more times to result in a further reduction in specific mass. The invention provides a means and procedure by which polystyrene of an initial specific mass of about 650 kg./m.³ may be expanded to an apparent specific mass of from 3.5 to 5 kg./m.³. The cycle may also be carried out by first treating the mass with hot air and then, following the rest or conditioning period, with steam. The apparatus affords means by which the process can be carried out in a continuous manner.

---

The present invention relates to expanded or blown polystyrene adapted for making articles such as blocks, slabs and shaped pieces and particularly to an improved process for expanding the granules of polystyrene preparatory to the manufacture of articles therefrom.

Expanded or blown polystyrene is generally formed by applying steam to granules of polystyrene containing a blowing agent. Such granules are known and their constitution has been described in the prior art. The low boiling hydrocarbons are satisfactory blowing agents, e.g. a pentane fraction. The blowing agent is vaporized by the effect of the heat and increases the volume of the granules so that they become expanded and cellular beads of polystyrene. To form articles from the expanded beads the gathered beads may be subjected to pressure and to heat enough to shape and agglomerate them into the form desired, for instance by placing the beads of polystyrene into a mold, applying heat of softening degree, and pressing with a movable piston.

It is economically desirable especially in making thermal insulation, to use a material of less density even though its coefficients of thermal conductivity are greater, as one obtains the same insulating power with less material. For example, if the insulation is formed of a product having a specific mass equal to 12 kg./m.³ and if it is desired to have a heat loss $q$ per surface unit per time unit corresponding to a thermal resistance of 1 Kcal./m.².h.° C., the weight of the insulation would be 420 g. To provide the same thermal resistance with a product having a specific mass equal to 8 kg./m.³, the weight of the insulation would be 320 g. or about 23% less than the weight of the insulation in the first case. For the same thermal resistance with a product having a specific mass equal to 6 kg./m.³, the weight of the insulation would be 275 g. or 34% less than in the first case.

With the known processes of expanding polystyrene containing a blowing agent—referred to as expansible polystyrene hereafter—mentioned above, it is possible to obtain a product which is light in weight and has good insulating properties. In this connection, it will be noted that there is a predetermined proportionate difference between the apparent density of the beads of polystyrene (that is to say, the density of a given volume occupied by beads and interstices) and the density of the final product which is obtained by compressing the beads to mold or otherwise from them into a desired shape. The value of this proportion is generally from 0.4 to 0.6 and preferably 0.5. By way of illustration, in order to obtain a product having a specific mass of 8 kg./m.³, a bulk of beads having an apparent specific mass of about 4 kg./m.³ would be used.

One process for obtaining expanded beads of polystyrene having low apparent specific masses for the fabrication of a lightweight product consists of treating granules of expansible polystyrene several times with steam with periods of rest between the applications of steam, and curing after the last one. The intermediate conditioning may be accompanied by passing a moderate flow of room air or warmed air through the mass of beads while the mass is together "in silo." This treatment reduces the apparent specific mass of the beads at each cycle. Starting with a body of granules of expansible polystyrene having an apparent specific mass of about 650 kg./m.³ and applying four or five sucessive operations of steam heating and conditioning, beads having an apparent specific mass of 7 kg./m.³ may be produced, but experience has shown that it is difficult to obtain beads having an apparent specific mass less than that.

An object of the present invention is to provide a process for producing beads of polystyrene having an apparent specific mass less than about 7 kg./m.³, preferably a density of 0.005 or less. Another object is to provide a process in which beads of polystyrene having an apparent specific mass on the order of 3 to 5 kg./m.³ are produced by two or three cycles of heat treatment. Another object is to provide a process and apparatus for continuously treating a moving flow of polystyrene granules to expand them into beads having an apparent specific mass of 5 kg./m.³ or less.

These and other objects of the invention are accomplished generally, in accordance with the process of this invention, by treating granules of expansible polystyrene at atmospheric pressure, by successive and alternate treatments with hot air and steam, with intermediate periods of rest between cycles, accompanied or not by insufflation with air at a temperature materially less than the temperature of the heat treatments.

In one manner of practicing the process of the invention, the granules are given their initial expansion by heating them first with hot air, e.g. at 90–100° C. In another manner, an initial expansion is accomplished applying steam first, before the hot air treatment, and this is particularly desirable. When such steam-expanded grains are used it is advisable to let the expanded grains rest in silo before administering the hot air treatment.

The change of the viscosity of the polystyrene during cooling is not generally sufficiently rapid to avoid some contraction of the beads when the internal pressure of the beads is reduced by the cooling. Therefore, if the cooling is not sufficiently slow to avoid contraction, the beads may be treated by diffusing warm air into the mass of resting beads, which will return them to the maximum volume they attained at the previous expansion.

Examples of the process of this invention for expansion of polystyrene at atmospheric pressure by means of hot air and steam are described below.

EXAMPLE 1

The starting material was granules of polystyrene containing a pentane fraction as blowing agent. They had an apparent specific mass of about 650 kg./m.$^3$. These granules were treated in a container at atmospheric pressure, with steam applied at an initial maximum pressure of 500 g./cm.$^2$ to avoid overheating the first granules with which the steam came in contact. The steam was applied for about 5 to 6 minutes after which the granules, now expanded into beads, were rested for 3 hours at 40° C., in a silo (a cylindrical container having perforated vertical inner walls, which permit air flow, and a conical base to the apex of which air conduits were attached). Warm air was passed through them. At the end of the period of rest the apparent specific mass of the beads was about 13 kg./m.$^3$.

The beads were then reheated with hot air to a temperature of 103° to 104° C. It is best not to have the air too hot. otherwise, it could cause the beads to stick together. When the beads reached 103° to 104° C. they were treated with steam for 30 to 40 seconds after which cool air was circulated over them until they were cooled to about 70° C. Alternatively, they could have been allowed to cool naturally or by circulating decreasingly cooler air over them. Then the beads were conditioned in a silo in a flow of air at 20° to 40° C. for from 1 to 24 hours after which the beads had an apparent specific mass of 5 to 8 kg./m.$^3$.

The treatment described above was then repeated, after which the beads had an apparent specific mass of 3.5 to 5 kg./m.$^3$, the major portion being 4 kg./m.$^3$.

EXAMPLE 2

In another example illustrating the invention, in a first stage, granules of expansible polystyrene having an apparent specific mass of 650 kg./m.$^3$ were transformed into beads having an apparent specific mass of 14 kg./m.$^3$ by treating them with steam as in Example 1. In a second stage the beads were reheated with hot air to 103° to 104° C. for about 65 seconds, after which they were treated with steam for about 35 seconds. Then the beads, in silo, were conditioned by circulating warm air at about 60° C. around them for several hours until the beads had an apparent specific mass of 4 kg./m.$^3$.

EXAMPLE 3

In the apparatus of Example 1 an initial expansion of polystyrene pearls was carried out at 90°–100° C. by the practices of the prior art with steam in an oven. This preexpansion was followed in one test by 24 hours conditioning (rest) at room temperature (20° C.), before the pearls were subjected to the treatment of the present invention, the cycle of air-steam rest. In another test the conditioning after the preexpansion was for 5 hours at 40° C. In a third test the conditioning was for 3 hours at 50° C. In all tests, it was found to be advisable to condition at temperatures below about 70° C. According to the present invention the preexpansion can be affected by air at temperatures between about 90° C. and 130° C., according to the molecular mass of the polystyrene. After the preexpansion and the conditioning the pearls were subjected to at least two cycles of air-steam-rest. In all of these cases the product was lighter than 7 kg./m.$^3$ and in the range of 3 to 5 kg./m.$^3$.

The different cycles of treatment of the granules and beads in accordance with the invention may be applied discontinuously, the granules or beads remaining in one place for treatment, or else continuously, the beads being treated by passing through apparatus for heating them with air followed by a treatment with steam. The continuous process has the advantage of providing more control and regularity of the reheating conditions and of avoiding the heat loss involved in heating and cooling metal members of apparatus or containers in contact with the granules. When the treatment with air and then steam of this invention is applied as a continuous process, with apparatus subsequently described for example, the desired results of the process are accomplished in two cycles (first and second paragraphs of Example 1) instead of three.

Apparatus for applying treatments in accordance with this invention in a continuous process is illustrated in the accompanying schematic drawing. It is to be expressly understood, however, that the drawing is for the purpose of illustration only and is not intended as a definition of the limits of the invention, reference for this latter purpose being had primarily to the appended claims.

Referring to the drawing, granules 10 of expansible polystyrene, which have been partially expanded by a preliminary treatment—with steam for example—and conditioned as described above, are conducted from a hopper 11 by a screw conveyor 12 into a channel formed by a pair of spaced apart chain link conveyor belts 13–14 which carry the granules to the right. The distance between the confronting runs of the conveyor belts 13–14 increases from the point at which the granules 10 are fed between the belts by the screw conveyor 12 and the point at the right end of the apparatus at which the granules leave the belts.

The conveyor belts 13 and 14 are each enclosed by housings A and B, respectively, which open toward each other. The two housings are divided by transverse partitions 23 which define compartments 15 to 20. Each compartment has inlets 24 and outlets 25 for the passage of hot air, cool air for conditioning or rest, or steam from appropriate sources. The gas passes through the granules 10 between the belts 13 and 14 and into the opposite portion of the compartment from which it is conducted out of the compartment. The flow of air or steam in successive compartments is respectively in the opposite direction, as indicated by the arrows. The compartments 15, 16, and 17 form a zone in which the granules are insufflated with hot air (15), cooled (16), steamed (17), cooled (18), insufflated with hot air (19) and with steam (20). After compartment 20 the cooling of the granules begins and conditioning is completed in storage silos of which 26 is a diagrammatic suggestion. The conveyor belts 13–14 deliver the granules into a conduit 21 in which the granules pass through a pair of rotary agitators 22, in their path out of the apparatus.

Among the advantages of the new process are that the product is lighter, uses less material, and is equally or more efficient as insulation. Another advantage is that there is a substantial reduction in the cost of the process, stemming somewhat from a reduced use of steam. Other advantages arise from the continuous method and the apparatus which controls it. A further advantage is an improved regularity in the use of each step of the process imparted by the continuous process, and the elimination of the silos and the thermal inertia of the silos used in the batch method. The continuous method usually requires only two cycles whereas the batch method often requires three.

Thanks in particular to the relation between the density of the beads expanded in accordance with the invention and the density of the final product, the products obtained have excellent cohesion and good mechanical properties, such as elasticity and resistance to compression, bending and stamping, despite their low density. The quantity of material required to provide a particular degree of thermal insulation is less with the polystyrene beads expanded in accordance with this invention than with the polystyrene expanded by previously used processes, which is an economic advantage.

The beads, as expanded by the process of this invention and before the formation of articles therefrom, may be provided with a density of 3 to 5 kg./m.$^3$ which is novel and has never previously been attained so far as I know. The expanded polystyrene beads have improved efficiency in their many useful applications, for instance as thermal or sound insulation and as a packing material.

The beads of expanded polystyrene make superior compressed industrial products, such as blocks, slabs and shaped pieces, with varying density resulting from molding, extrusion or continuous agglomeration at different pressures and temperatures.

When compressed to a density circa 10 kg./m.³ they have superior properties or strength, uniformity, and appearance, and are useful for many industrial applications requiring low heat transmission.

As many apparently widely different embodiments of the present invention may be made without departing from the spirit and scope thereof, it is to be understood that the invention is not limited to the specific embodiments.

What is claimed is:

1. The process of expanding granules of polystyrene containing a blowing agent and having a specific mass in the order of 650 kg./m.³, comprising, heating the granules for about 5 to 6 minutes by contacting them with a hot gas selected from the group consisting of hot air and steam introduced at low gage pressure to partly expand the granules, conditioning the granules for a few hours at about 40° C. by insufflation with warm air, reheating the partly expanded granules to about 103° C., insufflating the hot partly expanded granules for about 30 to 40 seconds with steam, conditioning the granules for from about 1 to 24 hours, at about 20° to about 60° C. by insufflation with air, and repeating the reheating, insufflation with steam and the second conditioning steps.

2. The process of expanding granules of polystyrene containing a blowing agent which comprises in its initial stage of heating the granules above 90° C., but below the temperature at which they would adhere together, by insufflation with a hot gas selected from the class consisting of hot air and steam, conditioning the partly expanded granules below about 70° C., reheating the conditioned granules to above about 90° C., but below the temperature at which they adhere together, by insufflation with hot air, insufflating the reheated granules with steam for a period of not more than one minute, cooling and resting the expanded product, again reheating the expanded and rested granules with hot air to above about 90° C., but below the temperature at which they would adhere together, insufflating the reheated granules with steam for a period not in excess of one minute, and cooling and resting the thrice expanded product.

3. The process of claim 2 in which the blowing agent is pentane.

4. The process of claim 2 in which the conditioned partly expanded and cooled granules move through a tunnel in which they are reheated and insufflated with steam, which is progressively enlarged to compensate for the expansion of the granules, and the insufflating gases flow in sequence through the moving mass of granules.

5. The process of claim 2 in which the granules are initially heated by insufflating them with steam for about 5 to 6 minutes, the pressure of the steam as it is brought into contact with the granules being about 500 g./cm.², are conditioned for several hours with air at a temperature of about 40° C., the partly expanded and conditioned granules are reheated to about 103° C. by insufflating them with hot air, the reheated granules are insufflated with steam for about 30 to 40 seconds, the steam treated granules are conditioned with air at a temperature of about 20° to 40° C., and are then reheated to about 103° C. by insufflating them with hot air, are insufflated with steam for about 30 to 40 seconds and are conditioned with air at a temperature of about 20 to 40° C.

6. The process of expanding granules of polystyrene having a blowing agent to form expanded beads having an average specific mass not over 5 to 8 kg./m.³ which comprises insufflating the granules in a container at atmospheric pressure with steam at an initial pressure of about 500 g./cm.² for about 5 to 6 minutes, resting the expanded beads for several hours at about 40° C., reheating the beads by insufflation with hot air to a temperature circa 103° to 104° C., below that at which they would adhere to each other, insufflating the hot beads with steam for less than a minute, cooling the beads by insufflation with cooler air, and conditioning the beads in silo by air flow.

References Cited

UNITED STATES PATENTS

| 2,884,386 | 4/1959 | McMillan et al. | 260—2.5(B) |
| 3,233,016 | 2/1966 | Kracht | 260—2.5(B) |

FOREIGN PATENTS

| 605,088 | 9/1960 | Canada | 260—2.5(B) |

MURRAY TILLMAN, Primary Examiner

W. J. BRIGGS, SR., Assistant Examiner

U.S. Cl. X.R.

18—1; 260—93.5; 264—51